(12) United States Patent
Suzuki (10) Patent No.: US 9,147,891 B2
(45) Date of Patent: Sep. 29, 2015

(54) FUEL CELL STACK

(71) Applicant: HONDA MOTOR CO., LTD., Minato-Ku, Tokyo (JP)

(72) Inventor: Masaharu Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 14/084,748

(22) Filed: Nov. 20, 2013

(65) Prior Publication Data

US 2014/0147765 A1    May 29, 2014

(30) Foreign Application Priority Data

Nov. 26, 2012 (JP) .................................. 2012-257746
May 31, 2013 (JP) .................................. 2013-115124

(51) Int. Cl.
*H01M 8/02* (2006.01)
*H01M 8/10* (2006.01)

(52) U.S. Cl.
CPC .......... *H01M 8/0258* (2013.01); *H01M 8/0206* (2013.01); *H01M 8/0267* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2011/0274999 A1    11/2011   Mohri et al.

FOREIGN PATENT DOCUMENTS

| JP | 2011-119061 A | 6/2011 |
| JP | 2011-171115 A | 9/2011 |
| JP | 2013-179087 A | 9/2013 |
| WO | 2010/082589 A1 | 7/2010 |

*Primary Examiner* — Patrick Ryan
*Assistant Examiner* — Wyatt McConnell
(74) *Attorney, Agent, or Firm* — Carrier Blackman & Associates, P.C.; Joseph P. Carrier; William D. Blackman (57) ABSTRACT

In a fuel cell stack, coolant supply passages are provided on both sides in the width direction of a coolant flow field. At an inlet of the coolant flow field, a substantially triangular inlet buffer is provided. A recess protruding inward of the substantially triangular shape is provided adjacent to a vertex of the inlet buffer protruding in a horizontal direction.

4 Claims, 12 Drawing Sheets

FUEL CELL STACK

CROSS-REFERENCE TO RELATED APPLICATIONS

This application is based upon and claims the benefit of priority from Japanese Patent Applications No. 2012-257746 filed on Nov. 26, 2012 and No. 2013-115124 filed on May 31, 2013, the contents all of which are incorporated herein by reference.

BACKGROUND OF THE INVENTION

1. Field of the Invention

The present invention relates to a fuel cell stack formed by stacking a plurality of fuel cells together. Each of the fuel cells is formed by stacking a membrane electrode assembly and separators together. The membrane electrode assembly includes a pair of electrodes and an electrolyte membrane interposed between the electrodes.

2. Description of the Related Art

For example, a solid polymer electrolyte fuel cell employs a solid polymer electrolyte membrane. The electrolyte membrane is a polymer ion exchange membrane. In the fuel cell, the electrolyte membrane is interposed between an anode and a cathode to form a membrane electrode assembly (MEA). The membrane electrode assembly and a pair of separators sandwiching the membrane electrode assembly make up a power generation cell (unit cell) for generating electricity. In use, typically, several tens to several hundreds of the power generation cells are stacked together to form a fuel cell stack, e.g., mounted in a vehicle.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, for every power generation cell or for every a predetermined number of power generation cells, one coolant flow field is formed between the adjacent separators, for supplying a coolant within electrode areas along surfaces of the separators.

Further, mostly, the fuel cell of this type adopts so called internal manifold structure. Specifically, a fuel gas supply passage and a fuel gas discharge passage, an oxygen-containing gas supply passage and an oxygen-containing gas discharge passage, and a coolant supply passage and a coolant discharge passage are formed in the fuel cell for allowing the fuel gas, the oxygen-containing gas, and the coolant to flow through the power generation cells in the stacking direction.

For example, a fuel cell stack disclosed in International Publication No. WO 2010/082589 includes power generation units each formed by stacking an electrolyte electrode assembly and metal separators. The electrolyte electrode assembly includes a pair of electrodes and an electrolyte interposed between the electrodes. Each of the metal separators has rectangular surfaces. The metal separator has a wavy gas flow field on its surface facing the electrode for supplying the fuel gas or the oxygen-containing gas as a reactant gas along the electrode. The power generation units are stacked together such that a coolant flow field, which corresponds to the back surface shape of the wavy gas flow field, is formed between the adjacent power generation units.

Further, a reactant gas supply passage and a reactant gas discharge passage as passages of the reactant gas extend respectively through two opposite sides of the metal separators in the stacking direction for allowing the reactant gas to flow through the reactant gas supply passage and the reactant gas discharge passage. A pair of coolant supply passages and a pair of coolant discharge passages as passages of the coolant extend through the other two opposite sides of the metal separators in the stacking direction, at least adjacent to the reactant gas supply passage or the reactant gas discharge passage, for allowing the coolant to flow through the coolant supply passages and the coolant discharge passages. The pair of coolant supply passages are arranged on the respective sides, while the pair of coolant discharge passages are also arranged on the respective sides.

Since the pair of coolant supply passages are provided separately on the two opposite sides and the pair of coolant discharge passages are also provided separately on the two opposite sides, it is possible to supply the coolant uniformly and reliably to the entire coolant flow field.

SUMMARY OF THE INVENTION

In the fuel cell, mostly, the coolant supply passages and the coolant flow field are connected by connection channels each including a plurality of flow grooves, and a buffer is provided at the inlet of the coolant flow field and between the pair of coolant supply passages. In the structure, the coolant flows from the coolant supply passages to the coolant flow field (power generation area) through the connection channels. After the coolant passes through the buffer, the coolant is supplied to the central portion of the power generation area.

In this regard, in some cases, the buffer has, e.g., a triangular shape in correspondence with the shapes of the openings of the reactant gas supply passage and the reactant gas discharge passage. In this case, the coolant flow tends to be concentrated at a vertex of the triangular shape protruding outward of the coolant flow field from the central side in the width direction of the coolant flow field, and stagnation of the coolant may occur undesirably.

Thus, the coolant cannot be supplied uniformly in the width direction of the coolant flow field, and the temperature in the power generation area becomes non-uniform. Further, the cooling efficiency tends to be lowered. For this reason, local degradation or stagnation of water may occur undesirably.

The present invention has been made to solve the problem of this type, and an object of the present invention is to provide a fuel cell stack having simple structure which makes it possible to supply a coolant to the entire surface of a power generation area uniformly, and suppress local degradation or stagnation of water due to the non-uniform temperature.

In the present invention, a fuel cell stack is formed by stacking a plurality of fuel cells together. Each of the fuel cells is formed by stacking a membrane electrode assembly and separators together. The membrane electrode assembly includes a pair of electrodes and an electrolyte membrane interposed between the electrodes. A coolant flow field is formed between adjacent ones of the separators for allowing a coolant to flow along surfaces of the separators. Buffers are provided respectively at an inlet of the coolant flow field and at an outlet of the coolant flow field. A pair of coolant supply passages are provided on both sides of the buffer in a flow field width direction at the inlet of the coolant flow field. A pair of coolant discharge passages are provided on both sides of the buffer in the flow field width direction at the outlet of the coolant flow field.

In the fuel cell stack, the buffer has a triangular shape having a vertex protruding outward of the coolant flow field from within a range of the flow field width of the coolant flow field. A recess protruding inward of the triangular shape is provided on the side of the vertex.

In the present invention, the flow of the coolant is distributed by the recess, and concentration of the coolant flow on a position adjacent to the vertex is suppressed. Therefore, it becomes possible to supply the coolant uniformly to the entire coolant flow field. Further, stagnation of the coolant near the vertex does not occur, and degradation of the cooling efficiency can be suppressed.

Accordingly, with the simple structure, it becomes possible to supply the coolant to the entire power generation surface uniformly and reliably, and suppress local degradation or stagnation of water due to the non-uniform temperature distribution as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
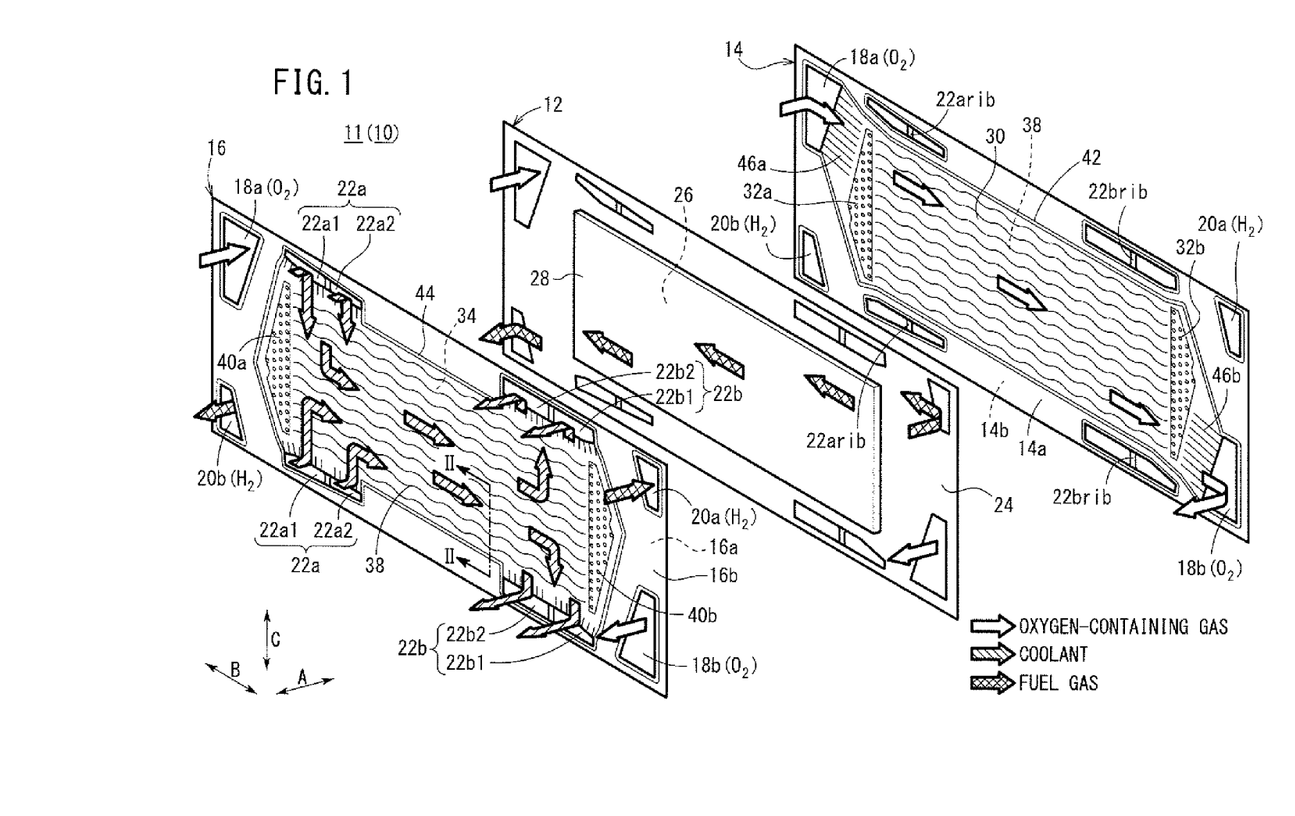
FIG. 1 is an exploded perspective view showing main components of a fuel cell of a fuel cell stack according to a first embodiment of the present invention.
Figure 2:
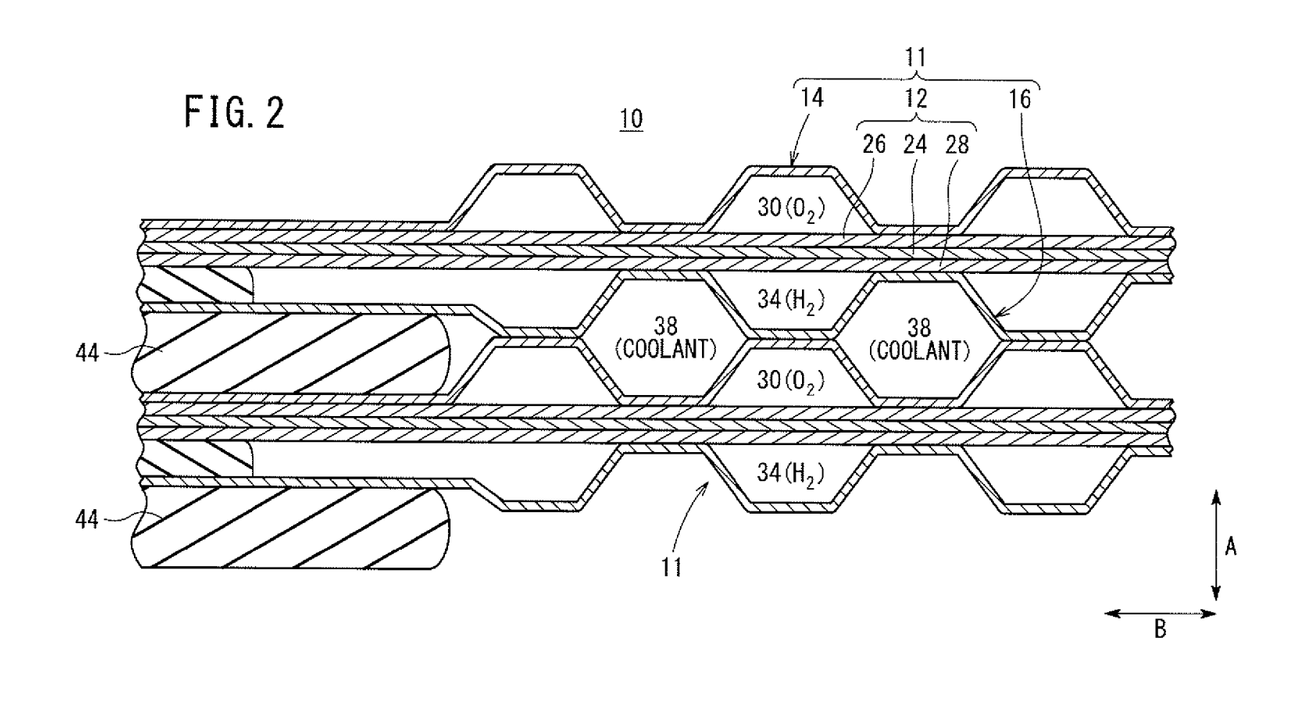
FIG. 2 is a cross sectional view showing the fuel cell, taken along line II-II in FIG. 1.

As shown in FIGS. 1 and 2, a fuel cell stack 10 according to a first embodiment of the present invention is formed by stacking a plurality of fuel cells 11 together in a direction indicated by an arrow A in an upright manner (i.e., such that electrode surfaces are oriented in parallel with the vertical direction). Each of the fuel cells 11 includes a membrane electrode assembly 12, and a cathode side separator 14 and an anode side separator 16 sandwiching the membrane electrode assembly 12 therebetween.

For example, the cathode side separator 14 and the anode side separator 16 are thin metal separators made of metal plates such as steel plates, stainless steel plates, aluminum plates, plated steel sheets, or metal plates having anti-corrosive surfaces by surface treatment. The metal separators have rectangular planar surfaces, and are formed by corrugating metal thin plates by press forming to have a corrugated shape in cross section. Alternatively, instead of the metal separators, carbon members may be used as the cathode side separator 14 and the anode side separator 16.

The cathode side separator 14 and the anode side separator 16 have a laterally elongated shape. The short sides of the cathode side separator 14 and the anode side separator 16 are oriented in the direction of gravity indicated by an arrow C, and the long sides of the cathode side separator 14 and the anode side separator 16 are oriented in a horizontal direction indicated by an arrow B (i.e., the cathode side separator 14 and the anode side separator 16 are stacked in the horizontal direction). Alternatively, the short sides of the cathode side separator 14 and the anode side separator 16 may be oriented in the horizontal direction, and the long sides of the cathode side separator 14 and the anode side separator 16 may be oriented in the direction of gravity. Further, the surfaces of the cathode side separator 14 and the anode side separator 16 may be oriented in the horizontal direction (i.e., the cathode side separator 14 and the anode side separator 16 may be stacked in the vertical direction).

At one end of the fuel cell 11 in a longitudinal direction thereof indicated by the arrow B, an oxygen-containing gas supply passage 18a and a fuel gas discharge passage 20b are provided. The oxygen-containing gas supply passage 18a extends through the fuel cell 11 in the direction indicated by the arrow A for supplying an oxygen-containing gas. The fuel gas discharge passage 20b extends through the fuel cell 11 in the direction indicated by the arrow A for discharging a fuel gas such as a hydrogen-containing gas. Each of the openings of the oxygen-containing gas supply passage 18a and the fuel gas discharge passage 20b has a substantially triangular shape, and the opening area of the oxygen-containing gas supply passage 18a is larger than the opening area of the fuel gas discharge passage 20b.

At the other end of the fuel cell 11 in the longitudinal direction, a fuel gas supply passage 20a for supplying the fuel gas and an oxygen-containing gas discharge passage 18b for discharging the oxygen-containing gas are provided. The fuel gas supply passage 20a and the oxygen-containing gas discharge passage 18b extend through the fuel cell 11 in the direction indicated by the arrow A. Each of the oxygen-containing gas discharge passage 18b and the fuel gas supply passage 20a has a substantially triangular shape, and the opening area of the oxygen-containing gas discharge passage 18b is larger than the opening area of the fuel gas supply passage 20a.

At both ends of the fuel cell 11 in a lateral direction thereof indicated by an arrow C, two coolant supply passages 22a for supplying a coolant are provided adjacent to the oxygen-containing gas supply passage 18a. The coolant supply passages 22a extend through the fuel cell 11 in the direction indicated by the arrow A. Further, at both ends of the fuel cell 11 in the lateral direction, two coolant discharge passages 22b for discharging the coolant are provided adjacent to the fuel gas supply passage 20a.

The opening of the coolant supply passage 22a has a rectangular shape elongated in the flow direction of a coolant flow field 38 (to be described later) indicated by the arrow B. At an intermediate position in the longitudinal direction of each of the rectangular coolant supply passages 22a, a rib 22arib dividing the rectangular shape into a first area 22a1 and a second area 22a2 is provided. The rib 22arib is not essential, and provided as necessary. The rib 22arib may not be provided.

The opening of the coolant discharge passage 22b has a rectangular shape elongated in the flow direction of the coolant flow field 38 indicated by the arrow B. At an intermediate position in the longitudinal direction of each of the rectangular coolant discharge passages 22b, a rib 22brib dividing the rectangular shape into a first area 22b1 and a second area 22b2 is provided. The rib 22brib is not essential, and provided as necessary. The rib 22brib may not be provided.

The membrane electrode assembly 12 includes, e.g., a fluorine-based or hydrocarbon-based solid polymer electrolyte membrane 24, and a cathode 26 and an anode 28 sandwiching the solid polymer electrolyte membrane 24.

Each of the cathode 26 and the anode 28 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 26 and the electrode catalyst layer of the anode 28 are deposited on both surfaces of the solid polymer electrolyte membrane 24, respectively.

As shown in FIG. 1, the cathode side separator 14 has a wavy (or straight) oxygen-containing gas flow field 30 on a surface 14a thereof facing the membrane electrode assembly 12. The oxygen-containing gas flow field 30 is connected to the oxygen-containing gas supply passage 18a and the oxygen-containing gas discharge passage 18b. An inlet buffer 32a including a plurality of bosses is provided adjacent to the inlet of the oxygen-containing gas flow field 30, and an outlet buffer 32b including a plurality of bosses is provided adjacent to the outlet of the oxygen-containing gas flow field 30.

The inlet buffer 32a has an asymmetrically triangular shape in correspondence with the shapes of the oxygen-containing gas supply passage 18a and the fuel gas discharge passage 20b. Further, a vertex of the triangular shape (the inlet buffer 32a) protruding in the horizontal direction is spaced downward from the central position in the height direction. The outlet buffer 32b has an asymmetrically triangular shape in correspondence with the shapes of the fuel gas supply passage 20a and the oxygen-containing gas discharge passage 18b. Further, a vertex of the triangular shape (the outlet buffer 32b) protruding in the horizontal direction is spaced upward from the central position in the height direction.

Figure 3:
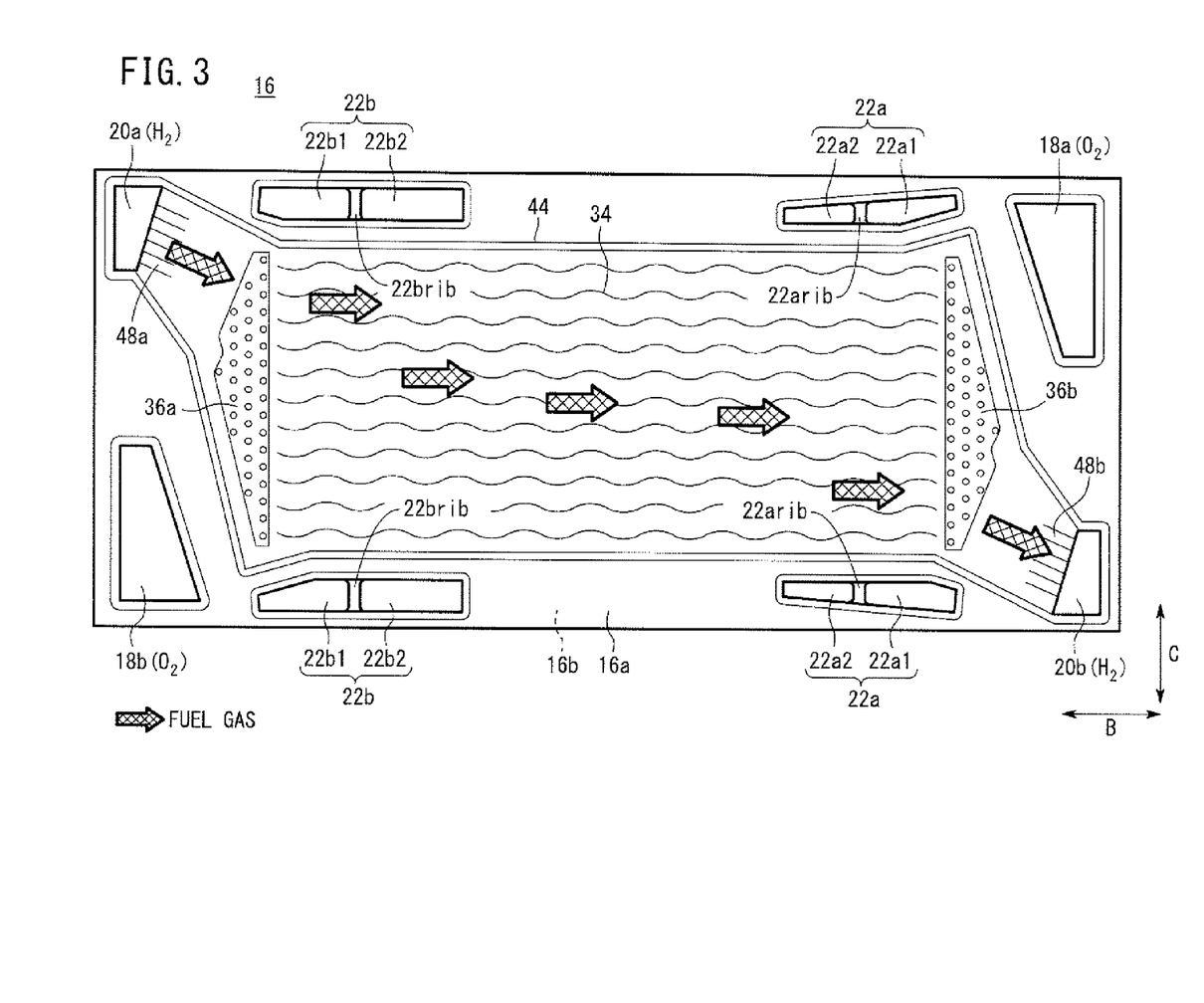
FIG. 3 is a view showing one surface of an anode side separator of the fuel cell.

As shown in FIG. 3, the anode side separator 16 has a wavy (or straight) fuel gas flow field 34 on a surface 16a thereof facing the membrane electrode assembly 12. The fuel gas flow field 34 is connected to the fuel gas supply passage 20a and the fuel gas discharge passage 20b. An inlet buffer 36a including a plurality of bosses is provided adjacent to the inlet of the fuel gas flow field 34, and an outlet buffer 36b including a plurality of bosses is provided adjacent to the outlet of the fuel gas flow field 34.

The inlet buffer 36a has a substantially triangular shape in correspondence with the shapes of the fuel gas supply passage 20a and the oxygen-containing gas discharge passage 18b. A vertex of the triangular shape (the inlet buffer 36a) protruding in the horizontal direction is spaced upward from the central position in the height direction. The outlet buffer 36b has a substantially triangular shape in correspondence with the shapes of the oxygen-containing gas supply passage 18a and the fuel gas discharge passage 20b. A vertex of the triangular shape (the outlet buffer 36b) protruding in the horizontal direction is spaced downward from the central position in the height direction.

The coolant flow field 38 is formed between a surface 16b of the anode side separator 16 and a surface 14b of the cathode side separator 14. The coolant flow field 38 is connected to the coolant supply passages 22a and the coolant discharge passages 22b (see FIGS. 1 and 4). In the coolant flow field 38, the coolant flows over the electrode areas of the membrane electrode assembly 12. An inlet buffer 40a is provided adjacent to the inlet of the coolant flow field 38, and an outlet buffer 40b is provided adjacent to the outlet of the coolant flow field 38.

Figure 4:
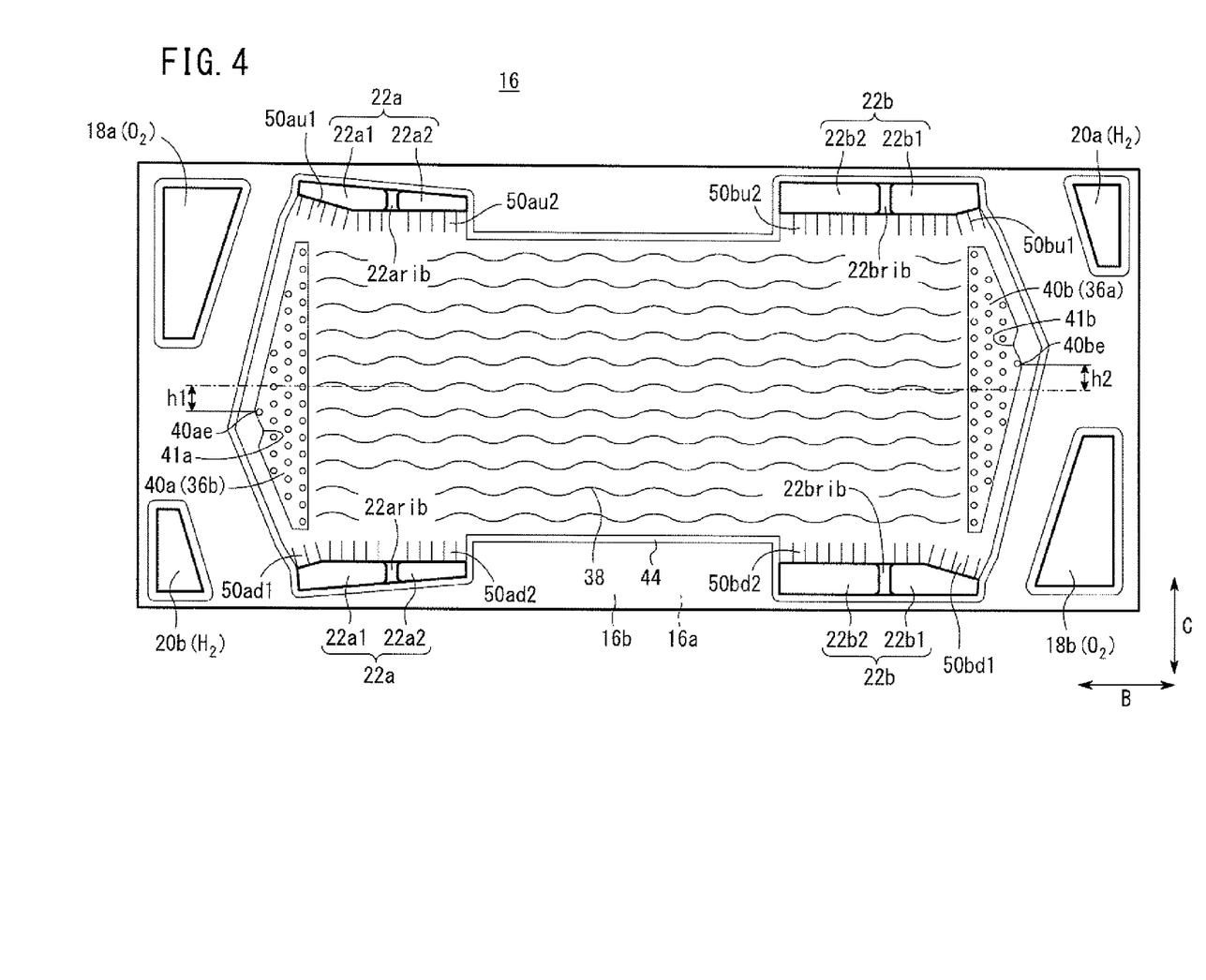
FIG. 4 is a view showing the other surface of the anode side separator.

As shown in FIG. 4, in the anode side separator 16, the coolant flow field 38 corresponds to the back surface shape of the fuel gas flow field 34, the inlet buffer 40a corresponds to the back surface shape of the outlet buffer 36b, and the outlet buffer 40b corresponds to the back surface shape of the inlet buffer 36a. In the cathode side separator 14, the coolant flow field 38 corresponds to the back surface shape of the oxygen-containing gas flow field 30, the inlet buffer 40a corresponds to the back surface shape of the inlet buffer 32a, and the outlet buffer 40b corresponds to the back surface shape of the outlet buffer 32b. Hereinafter, the separator structure of the anode side separator 16 will be described as an example. The coolant flow field 38 may include straight flow grooves. Further, one coolant flow field 38 may be provided with respect to every predetermined number of fuel cells.

The inlet buffer 40a has a substantially triangular shape in correspondence with the shapes of the oxygen-containing gas supply passage 18a and the fuel gas discharge passage 20b. A vertex 40ae of the triangular shape (the inlet buffer 40a) protruding in the horizontal direction is spaced downward from the central position by a distance h1 in the height direction (flow field width direction) indicated by the arrow C. A recess 41a protruding inward of the substantially triangular shape is provided adjacent to the vertex 40ae, more specifically, adjacent to a position below the vertex 40ae (one side of the triangular shape).

The outlet buffer 40b has a substantially triangular shape in correspondence with the shapes of the fuel gas supply passage 20a and the oxygen-containing gas discharge passage 18b. A vertex 40be of the triangular shape (the outlet buffer 40b) protruding in the horizontal direction is spaced upward from the central position by a distance h2 in the height direction (flow field width direction) indicated by the arrow C. A recess 41b protruding inward of the substantially triangular shape is provided adjacent to the vertex 40be, more specifically, adjacent to a position above the vertex 40be (one side of the triangular shape).

As shown in FIG. 1, a first seal member 42 is formed integrally with the surfaces 14a, 14b of the cathode side separator 14 around the outer circumferential end of the cathode side separator 14. A second seal member 44 is formed integrally with the surfaces 16a, 16b of the anode side separator 16, around the outer circumferential end of the anode side separator 16.

Each of the first seal member 42 and the second seal member 44 is an elastic seal member made of seal material, cushion material, or packing material such as an EPDM (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, an acrylic rubber, etc.

An inlet connection channel 46a including a plurality of flow grooves connecting the inlet buffer 32a and the oxygen-containing gas supply passage 18a, and an outlet connection channel 46b including a plurality of flow grooves connecting the outlet buffer 32b and the oxygen-containing gas discharge passage 18b are formed on the surface 14a of the cathode side separator 14, by cutting the first seal member 42.

As shown in FIG. 3, an inlet connection channel 48a including a plurality of flow grooves connecting the inlet buffer 36a and the fuel gas supply passage 20a, and an outlet connection channel 48b including a plurality of flow grooves connecting the outlet buffer 36b and the fuel gas discharge passage 20b are formed on the surface 16a of the anode side separator 16, by cutting the second seal member 44.

As shown in FIG. 4, inlet connection channels 50au1, 50au2 are formed adjacent to the upper coolant supply passage 22a, and inlet connection channels 50ad1, 50ad2 are formed adjacent to the lower coolant supply passage 22a, on the surface 16b of the anode side separator 16, by cutting the second seal member 44. The number of flow grooves in the inlet connection channel 50au1 is different from the number of flow grooves in the inlet connection channel 50ad1.

The inlet connection channel 50au1 connects the upper coolant supply passage 22a and the inlet buffer 40a, and the inlet connection channel 50ad1 connects the lower coolant supply passage 22a and the inlet buffer 40a.

The inlet connection channel 50au2 connects the upper coolant supply passage 22a and the coolant flow field 38. The inlet connection channel 50ad2 connects the lower coolant supply passage 22a and the coolant flow field 38.

Outlet connection channels 50bu1, 50bu2 each including a plurality of flow grooves are formed adjacent to the upper coolant discharge passage 22b, and outlet connection channels 50bd1, 50bd2 each including a plurality of flow grooves are formed adjacent to the lower coolant discharge passage 22b, on the surface 16b of the anode side separator 16, by cutting the second seal member 44.

The outlet connection channel 50bu1 connects the upper coolant discharge passage 22b and the outlet buffer 40b, and the outlet connection channel 50bd1 connects the lower coolant discharge passage 22b and the outlet buffer 40b.

The outlet connection channel 50bu2 connects the upper coolant discharge passage 22b and the coolant flow field 38. The outlet connection channel 50bd2 connects the lower coolant discharge passage 22b and the coolant flow field 38.

Operation of the fuel cell 11 will be described below.

Firstly, as shown in FIG. 1, an oxygen-containing gas is supplied to the oxygen-containing gas supply passage 18a, and a fuel gas such as a hydrogen containing gas is supplied to the fuel gas supply passage 20a. Further, a coolant such as pure water, ethylene glycol, oil, etc. is supplied to the pair of the coolant supply passages 22a.

Thus, the oxygen-containing gas flows from the oxygen-containing gas supply passage 18a into the oxygen-containing gas flow field 30 of the cathode side separator 14. The oxygen-containing gas moves along the oxygen-containing gas flow field 30 in the horizontal direction indicated by the arrow B, and the oxygen-containing gas is supplied to the cathode 26 of the membrane electrode assembly 12 for inducing an electrochemical reaction at the cathode 26.

In the meanwhile, the fuel gas flows from the fuel gas supply passage 20a into the fuel gas flow field 34 of the anode side separator 16. As shown in FIG. 3, the fuel gas moves along the fuel gas flow field 34 in the horizontal direction indicated by the arrow B, and the fuel gas is supplied to the anode 28 of the membrane electrode assembly 12 for inducing an electrochemical reaction at the anode 28 (see FIG. 1).

Thus, in the membrane electrode assembly 12, the oxygen-containing gas supplied to the cathode 26, and the fuel gas supplied to the anode 28 are consumed in the electrochemical reactions at catalyst layers of the cathode 26 and the anode 28 for generating electricity.

The oxygen-containing gas consumed at the cathode 26 of the membrane electrode assembly 12 is discharged along the oxygen-containing gas discharge passage 18b in the direction indicated by the arrow A. Likewise, the fuel gas consumed at the anode 28 of the membrane electrode assembly 12 is discharged along the fuel gas discharge passage 20b in the direction indicated by the arrow A.

Further, the coolant supplied to the pair of the coolant supply passages 22a flows into the coolant flow field 38 between the cathode side separator 14 and the anode side separator 16. As shown in FIGS. 1 and 4, the coolant first flows inward in the direction of gravity indicated by the arrow C, and the coolant thereafter moves in the horizontal direction indicated by the arrow B for cooling the membrane electrode assembly 12. Then, after the coolant moves outward in the direction indicated by the arrow C, the coolant is discharged into the pair of coolant discharge passages 22b.

In the first embodiment, as shown in FIG. 4, the inlet buffer 40a has a substantially triangular shape in correspondence with the shapes of the oxygen-containing gas supply passage 18a and the fuel gas discharge passage 20b. The inlet buffer 40a has the vertex 40ae protruding outward of the coolant flow field 38 from within the range of the flow field width of the coolant flow field 38. Further, the recess 41a protruding inward of the substantially triangular shape is provided adjacent to the vertex 40ae.

In the structure, the flow of the coolant is distributed by the recess 41a, and concentration of the coolant flow on a position adjacent to the vertex 40ae is prevented. It becomes possible to supply the coolant to the entire coolant flow field 38 uniformly. Further, stagnation of the coolant adjacent to the vertex 40ae does not occur, and degradation of the cooling efficiency can be suppressed.

Figure 5:
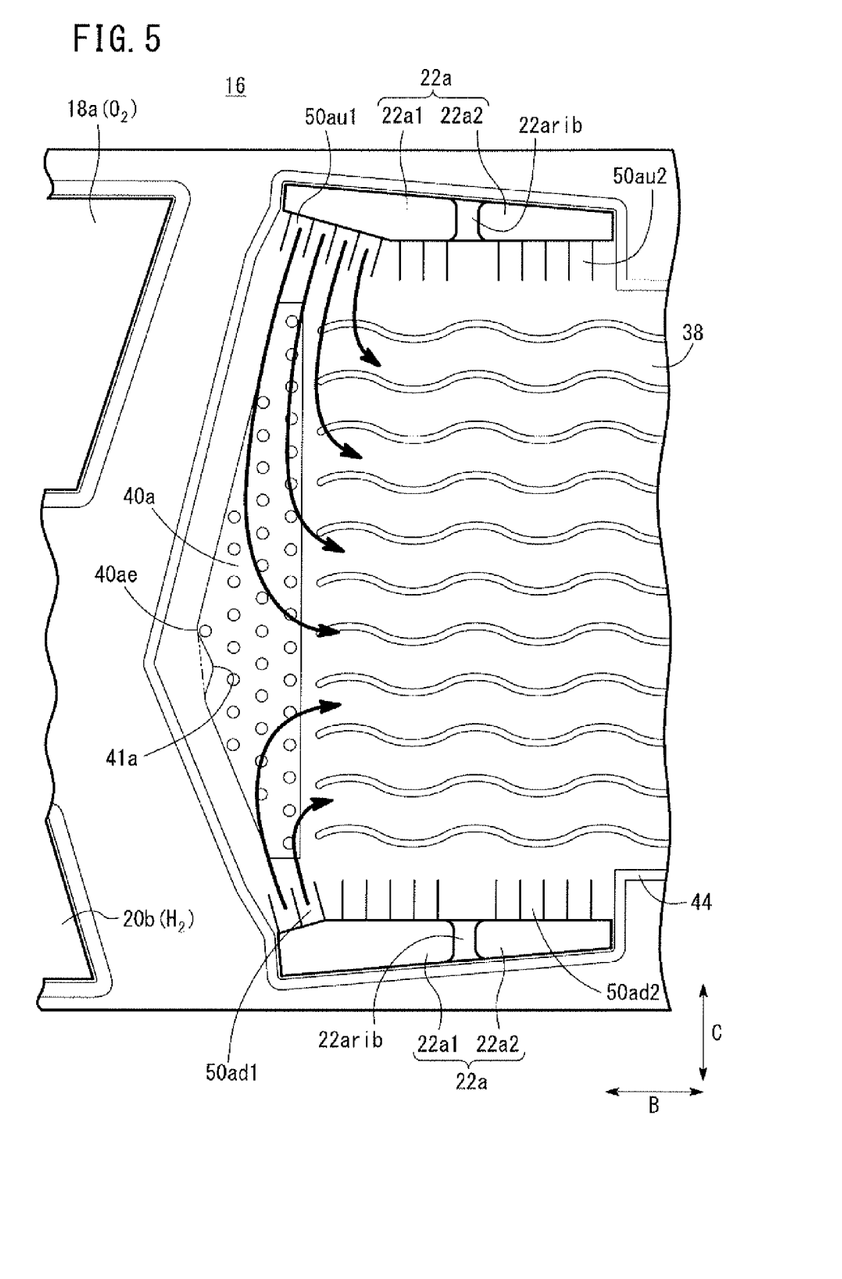
FIG. 5 is a view showing main components of coolant supply passages of the fuel cell.

In this regard, a comparison of the distribution state of the coolant supplied to the coolant flow field 38 was made between a structure without the recess 41a adjacent to the vertex 40ae (conventional example) as shown by one dot chain line in FIG. 5 and a structure having the recess 41a adjacent to the vertex 40ae (example of the present invention).

Figure 6:
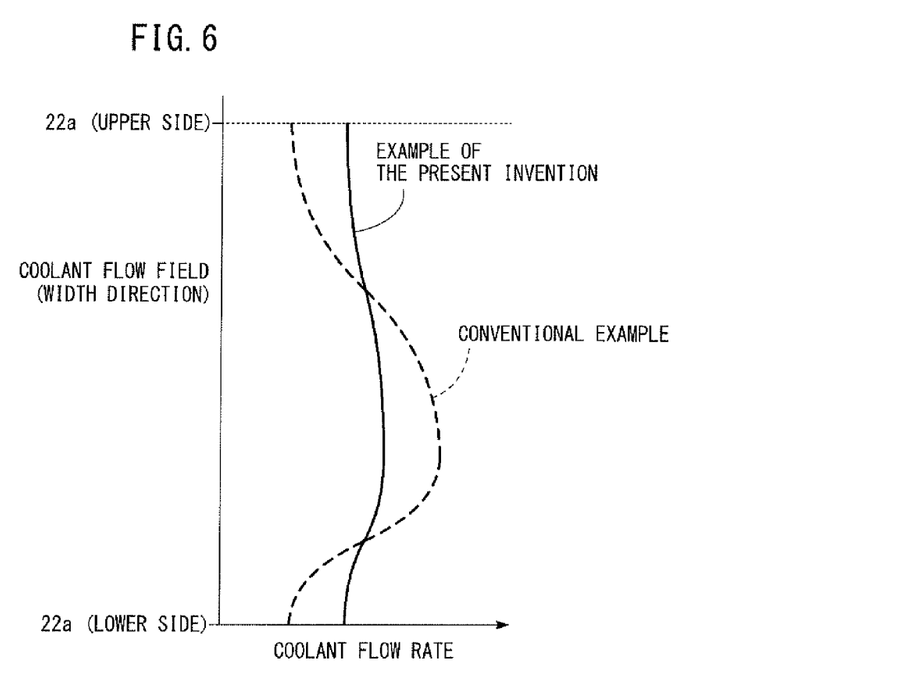
FIG. 6 is a graph for comparison of the flow rate of the coolant supplied to the coolant flow field between an example of the present invention and a conventional example.

The result shown in FIG. 6 indicates that in the structure of the conventional example, the coolant flow tends to be concentrated at a position adjacent to the vertex 40ae, and the flow rate at the center in the width direction of the coolant flow field 38 is larger than the flow rate of the coolant at both ends in the width direction of the coolant flow field 38. Therefore, a large temperature difference tends to occur in the width direction of the coolant flow field 38, and thus, durability and power generation stability are low. Further, stagnation of the coolant tends to occur at a position adjacent to the vertex 40ae, and the cooling efficiency is low.

In contrast, in the example of the present invention, the recess 41a protruding inward of the substantially triangular shape is provided adjacent to a position below the vertex 40ae. Therefore, as shown in FIG. 5, the coolant supplied from the inlet connection channels 50au1, 50ad1 is distributed suitably in the inlet buffer 40a. Thus, as shown in FIG. 6, the coolant can be supplied uniformly over the coolant flow field 38 in the width direction.

Accordingly, with the simple structure, it is possible to supply the coolant over the entire power generation area, and it becomes possible to suppress local degradation or stagnation of water due to the non-uniform temperature distribution as much as possible. It should be noted that the structure on the part of the outlet buffer 40b is the same as the structure on the part of the inlet buffer 40a, and thus, the same advantages can be obtained.

Figure 7:
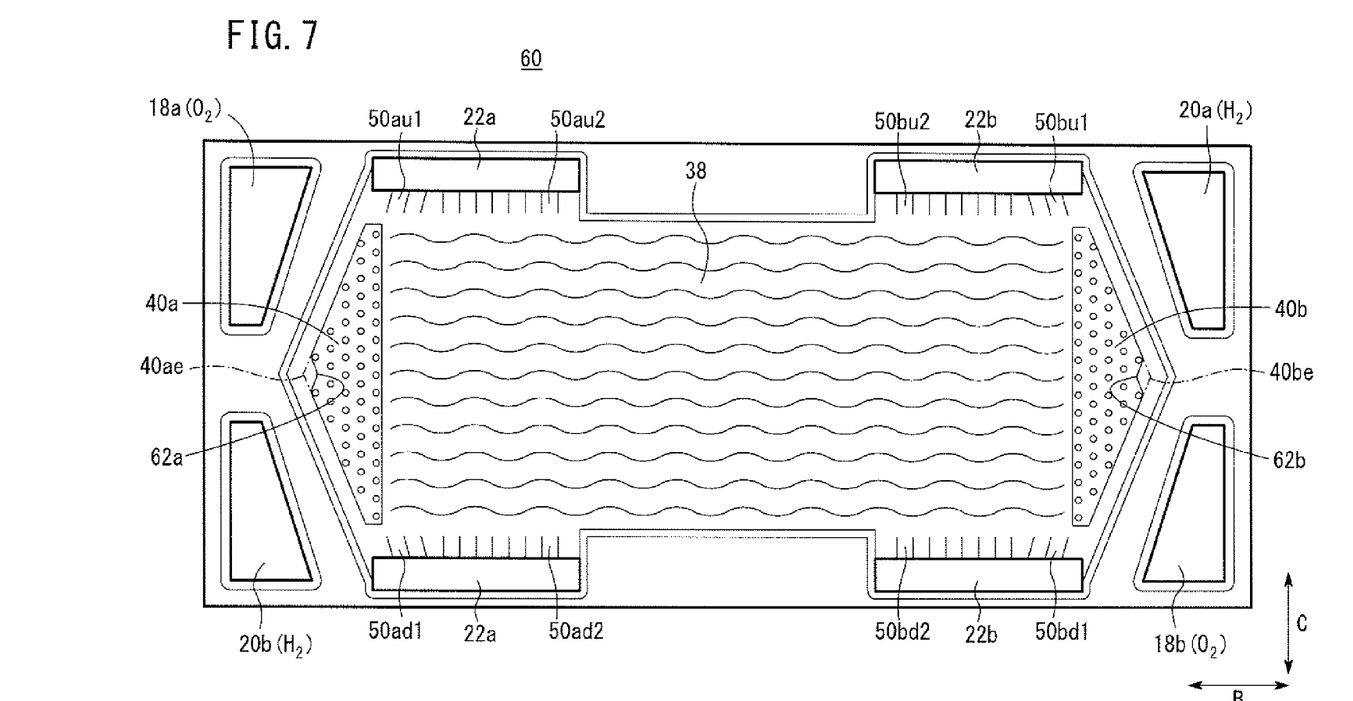
FIG. 7 is a front view showing an anode side separator of a fuel cell stack according to a second embodiment of the present invention.

FIG. 7 is a front view showing an anode side separator 60 of a fuel cell stack according to a second embodiment of the present invention. The constituent elements that are identical to those of the anode side separator 16 of the fuel cell stack 10 according to the first embodiment are labeled with the same reference numerals, and description thereof will be omitted.

In the second embodiment, the opening area of the oxygen-containing gas supply passage 18a and the opening area of the fuel gas discharge passage 20b are substantially the same, and the opening area of the oxygen-containing gas discharge passage 18b and the opening area of the fuel gas supply passage 20a are substantially the same. Each of the inlet buffer 40a and the outlet buffer 40b has a triangular shape, and vertices 40ae, 40be of the inlet buffer 40a and the outlet buffer 40b are positioned at the center in the height direction. A recess 62a protruding inward of the triangular shape is provided at the vertex 40ae, and a recess 62b protruding inward of the triangular shape is provided at the vertex 40be.

In the second embodiment, the recess 62a is provided at the vertex 40ae of the triangular inlet buffer 40a. In the structure, the flow of the coolant is distributed by the recess 62a, and concentration of the coolant flow on a position adjacent to the vertex 40ae is suppressed. Accordingly, the same advantages as in the case of the first embodiment are obtained. For example, it becomes possible to supply the coolant to the entire coolant flow field 38 uniformly.

Figure 8:
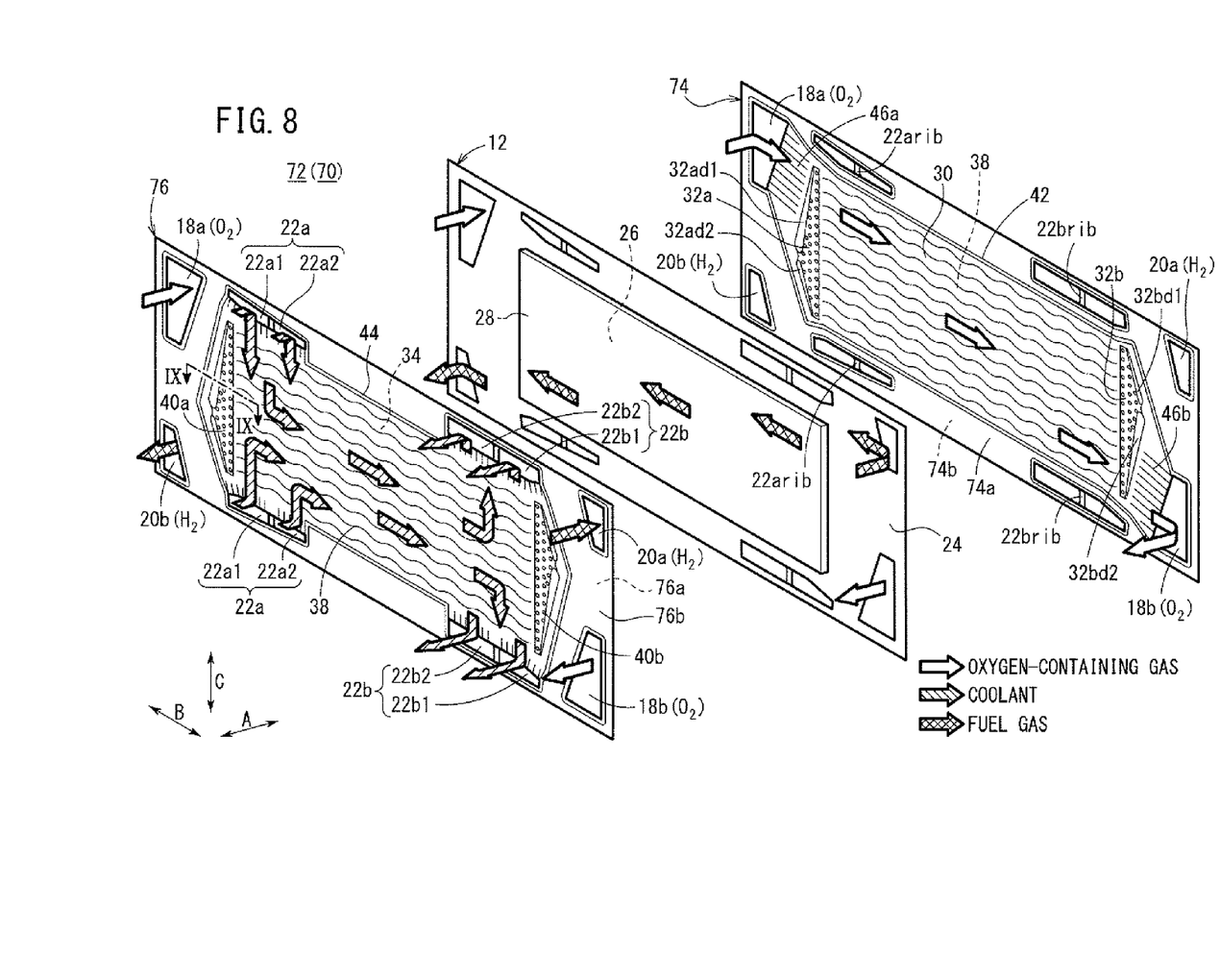
FIG. 8 is an exploded perspective view showing main components of a fuel cell of a fuel cell stack according to a third embodiment of the present invention.

FIG. 8 is an exploded perspective view showing main components of a fuel cell 72 of a fuel cell stack 70 according to a third embodiment of the present invention. The constituent elements that are identical to those of the fuel cell stack 10 according to the first embodiment are labeled with the same reference numerals, and description thereof will be omitted.

Figure 9:
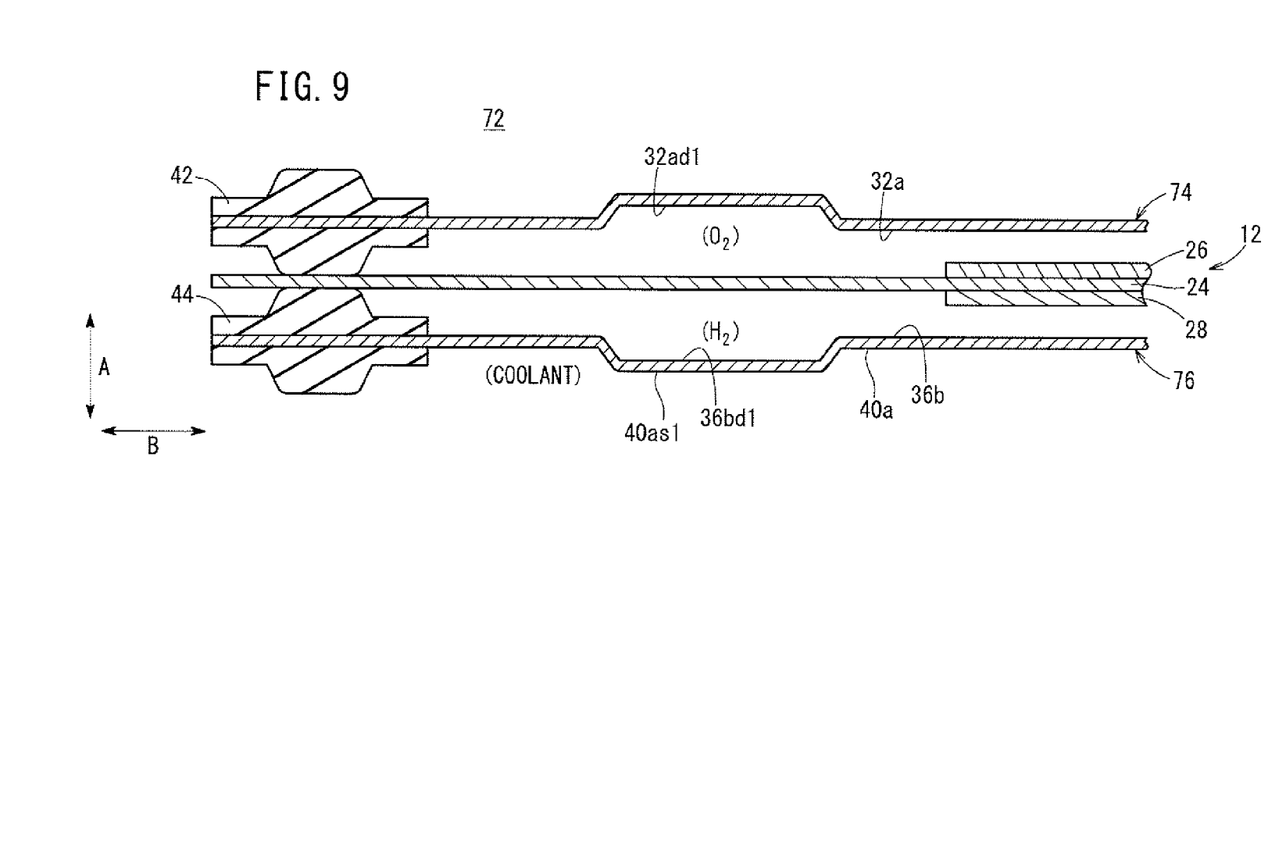
FIG. 9 is a cross sectional view showing the fuel cell, taken along line IX-IX in FIG. 8.

As shown in FIGS. 8 and 9, the fuel cell 72 includes a membrane electrode assembly 12, and a cathode side separator 74 and an anode side separator 76 sandwiching the membrane electrode assembly 12.

Figure 10:
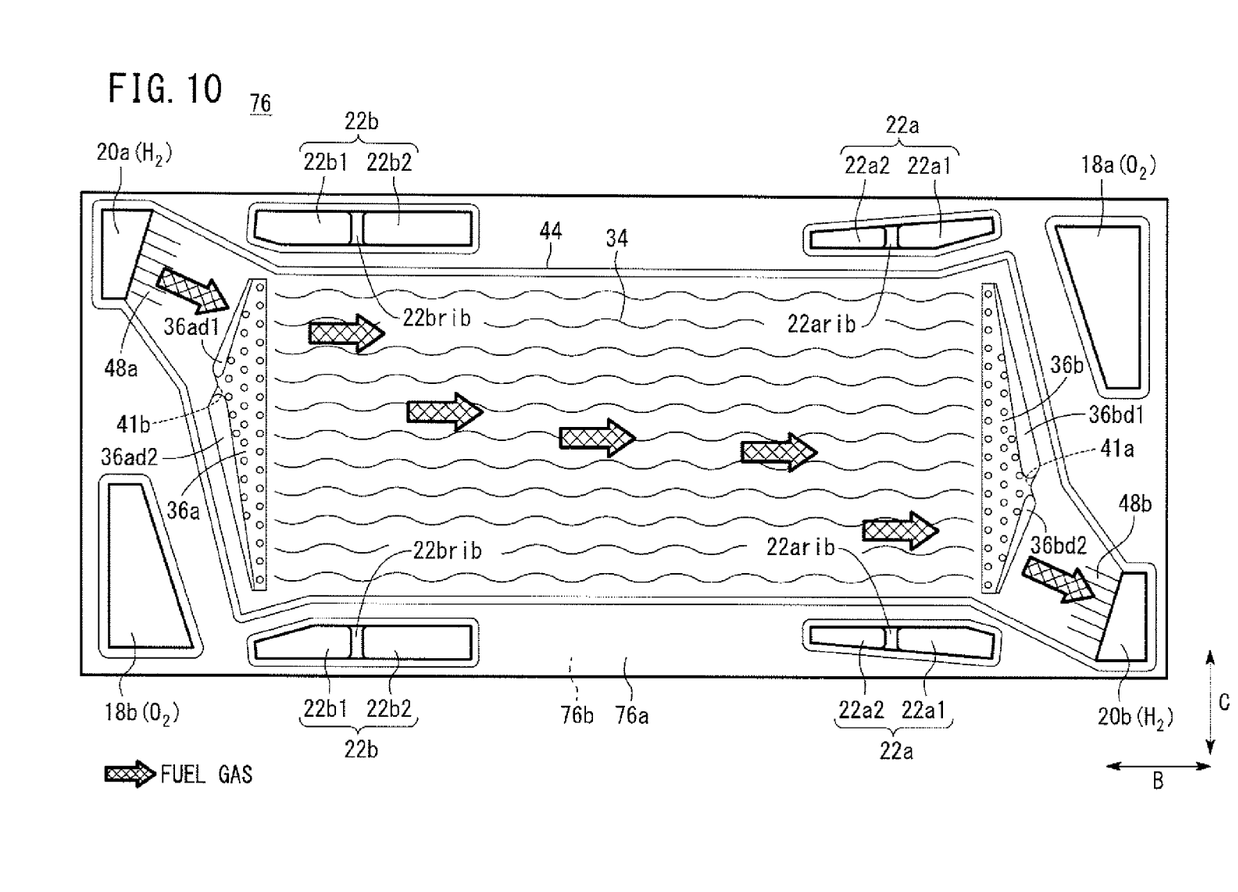
FIG. 10 is a view showing one surface of an anode side separator of the fuel cell.

As shown in FIG. 10, on a surface 76a of the anode side separator 76, an inlet buffer 36a is provided adjacent to the inlet of the fuel gas flow field 34, and an outlet buffer 36b is provided adjacent to the outlet of the fuel gas flow field 34. The inlet buffer 36a includes two sides with the back surface shape of the recess 41b being interposed therebetween, and deep buffer areas 36ad1, 36ad2 that are deeper than the other buffer areas are provided on the two sides. It should be noted that only one of the deep buffer areas 36ad1, 36ad2 may be provided.

The outlet buffer 36b includes two sides with the back surface shape of the recess 41a being interposed therebetween, and deep buffer areas 36bd1, 36bd2 that are deeper than the other buffer areas are provided on the two sides (see FIG. 9). It should be noted that only one of the deep buffer areas 36bd1, 36bd2 may be provided.

Figure 11:
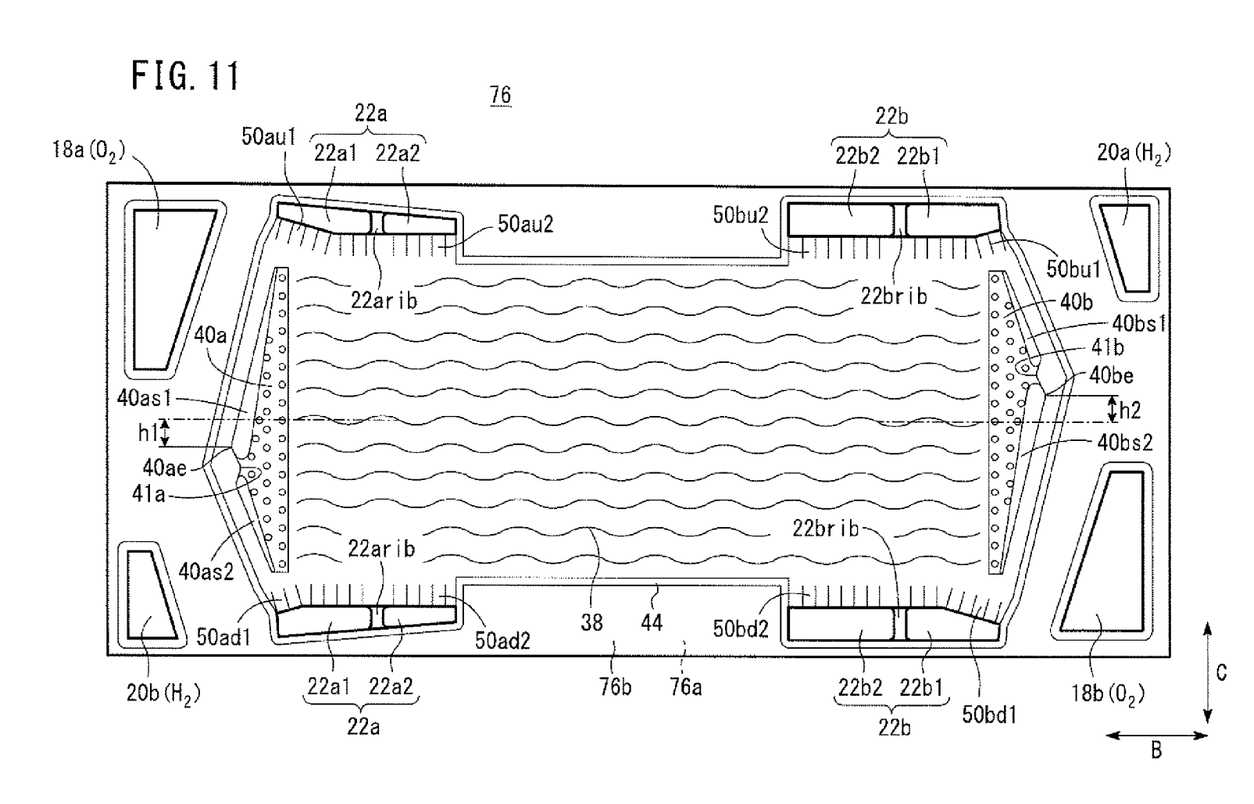
FIG. 11 is a view showing the other surface of the anode side separator.

As shown in FIG. 11, on a surface 76b of the anode side separator 76, an inlet buffer 40a is provided adjacent to the inlet of the coolant flow field 38, and an outlet buffer 40b is provided adjacent to the outlet of the coolant flow field 38. The inlet buffer 40a includes two sides with the recess 41a being interposed therebetween, and shallow buffer areas (corresponding to the back surface shapes of the deep buffer areas 36bd1, 36bd2) 40as1, 40as2 that are shallower than the other buffer areas are provided on the two sides (see FIG. 9). It should be noted that only one of the shallow buffer areas 40as1, 40as2 may be provided.

The outlet buffer 40b includes two sides with the recess 41b being interposed therebetween, and shallow buffer areas (corresponding to the back surface shapes of the deep buffer areas 36ad1, 36ad2) 40bs1, 40bs2 that are shallower than the other buffer areas are provided on the two sides. It should be noted that only one of the shallow buffer areas 40bs1, 40bs2 may be provided.

As shown in FIG. 8, on a surface 74a of the cathode side separator 74, an inlet buffer 32a is provided adjacent to the inlet of the oxygen-containing gas flow field 30, and an outlet buffer 32b is provided adjacent to the outlet of the oxygen-containing gas flow field 30. The inlet buffer 32a has deep buffer areas 32ad1, 32ad2 that are deeper than the other buffer areas. The outlet buffer 32b has deep buffer areas 32bd1, 32bd2 that are deeper than the other buffer areas (see FIG. 9). It should be noted that only one of the deep buffer areas 32bd1, 32bd2 may be provided. On a surface 74b of the cathode side separator 74, the back surface shape of the oxygen-containing gas flow field 30 forms part of the coolant flow field 38.

Figure 12:
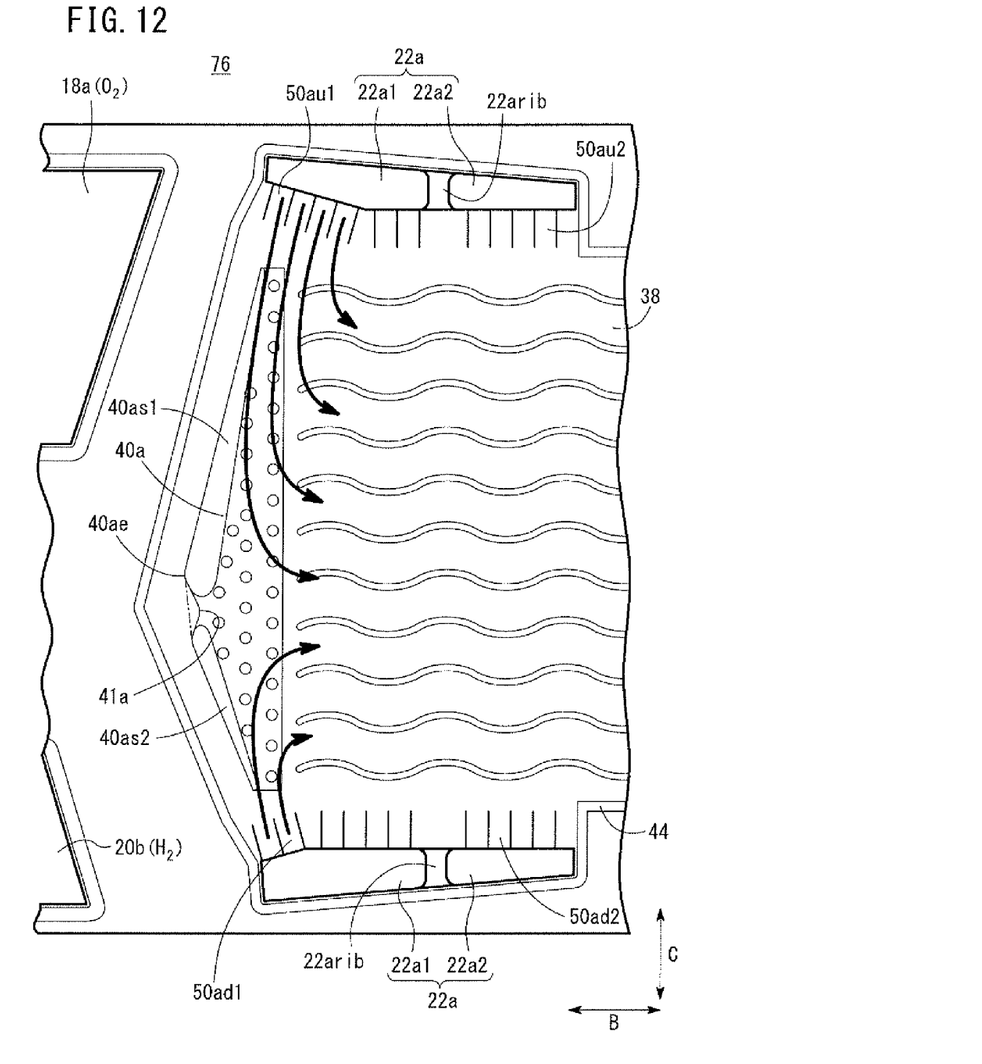
FIG. 12 is a view showing main components of coolant supply passages of the fuel cell.

In the third embodiment, as shown in FIG. 12, the coolant supplied from the inlet connection channels 50au1, 50ad1 flows along the shallow buffer areas 40as1, 40as2 inside the inlet buffer 40a. Thus, the coolant can be supplied over the coolant flow field 38 in the width direction further uniformly and reliably.

In the outlet buffer 40b, the coolant from the coolant flow field 38 flows along the shallow buffer areas 40bs1, 40bs2 inside the outlet buffer 40b. In the structure, the coolant can be discharged uniformly to the pair of upper and lower coolant discharge passages 22b.

Accordingly, in the third embodiment, with the simple structure, the same advantages as in the case of the first embodiment are obtained. For example, it is possible to suppress local degradation or stagnation of water due to the non-uniform temperature distribution as much as possible.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack formed by stacking a plurality of fuel cells together, the fuel cells each being formed by stacking a membrane electrode assembly and separators together, the membrane electrode assembly including a pair of electrodes and an electrolyte membrane interposed between the electrodes, a coolant flow field being formed between adjacent ones of the separators for allowing a coolant to flow along surfaces of the separators, buffers being provided respectively at an inlet of the coolant flow field and at an outlet of the coolant flow field, a pair of coolant supply passages being provided on both sides of the buffer in a flow field width direction at the inlet of the coolant flow field, a pair of coolant discharge passages being provided on both sides of the buffer in the flow field width direction at the outlet of the coolant flow field, wherein the buffer has a triangular shape having a vertex protruding outward of the coolant flow field from within a range of the flow field width of the coolant flow field; and a recess protruding inward of the triangular shape is provided on a side of the vertex.

2. The fuel cell stack according to claim 1, wherein the separator comprises a metal separator;

on one surface of the metal separator, a reactant gas flow field is provided for allowing an oxygen-containing gas or a fuel gas as a reactant gas to flow along the surface of the metal separator, and reactant gas buffers connected respectively to the inlet and the outlet of the reactant gas flow field are provided; and on the other surface of the metal separator, the coolant flow field corresponding to the back surface shape of the reactant gas flow field is provided, and the buffers corresponding to the back surface shapes of the reactant gas buffers are provided.

3. The fuel cell stack according to claim 1, wherein the buffer has a substantially triangular shape including the vertex at a position spaced from the center in the flow field width direction toward one side in the flow field width direction.

4. The fuel cell stack according to claim 1, wherein the buffer includes two sides with the recess being interposed therebetween, and a shallow buffer area that is shallower than the other buffer areas is provided on at least one of the two sides.

* * * * *